United States Patent
Kadomura et al.

(10) Patent No.: US 7,747,053 B2
(45) Date of Patent: *Jun. 29, 2010

(54) IMAGE DIAGNOSIS SUPPORTING SYSTEM AND METHOD

(75) Inventors: Takayuki Kadomura, Chiba (JP); Taiga Goto, Chiba (JP)

(73) Assignee: Hitachi Medical Corporation, Tokyo (JP)

( * ) Notice: Subject to any disclaimer, the term of this patent is extended or adjusted under 35 U.S.C. 154(b) by 923 days.

This patent is subject to a terminal disclaimer.

(21) Appl. No.: 11/578,850

(22) PCT Filed: Apr. 27, 2005

(86) PCT No.: PCT/JP2005/007957

§ 371 (c)(1),
(2), (4) Date: Oct. 19, 2006

(87) PCT Pub. No.: WO2005/104953

PCT Pub. Date: Nov. 10, 2005

(65) Prior Publication Data

US 2007/0172103 A1 Jul. 26, 2007

(30) Foreign Application Priority Data

Apr. 28, 2004 (JP) ............................. 2004-132914

(51) Int. Cl.
*G06K 9/00* (2006.01)
*A61B 5/05* (2006.01)

(52) U.S. Cl. ...................... 382/128; 382/287; 600/425

(58) Field of Classification Search ................. 382/100, 382/128, 129, 130, 131, 132, 133, 134, 168, 382/172, 179, 181, 189, 190, 199, 224, 232, 382/254, 274, 276, 287, 291, 305; 600/425; 378/4, 21, 22, 24

See application file for complete search history.

(56) References Cited

U.S. PATENT DOCUMENTS

| | | | | | |
|---|---|---|---|---|---|
| 5,807,256 | A | * | 9/1998 | Taguchi et al. | 600/425 |
| 6,542,771 | B2 | * | 4/2003 | Saotome et al. | 600/425 |
| 6,934,409 | B2 | * | 8/2005 | Ohara | 382/132 |
| 7,245,754 | B2 | * | 7/2007 | Goto | 382/128 |
| 7,499,577 | B2 | * | 3/2009 | Takeo | 382/128 |
| 2003/0179915 | A1 | | 9/2003 | Goto | |

FOREIGN PATENT DOCUMENTS

| | | |
|---|---|---|
| JP | 7-323024 | 12/1995 |
| JP | 2001-187044 | 7/2001 |
| JP | 2002-325761 | 11/2002 |

* cited by examiner

*Primary Examiner*—Seyed Azarian
(74) *Attorney, Agent, or Firm*—Cooper & Dunham LLP

(57) ABSTRACT

An image diagnosis supporting system comprising a means for reading in image data representative of the image of a subject acquired by a medical imaging apparatus, a means for detecting an abnormal shadow candidate satisfying at least one of a plurality of criteria for abnormal shadow criteria from the image thus read in, and a means for displaying the image thus read in and a marker indicative of the abnormal shadow candidate thus detected in a superimposed state.

The image diagnosis supporting system is further provided with a means for setting criteria supporting judgment of the abnormal shadow candidate detected by the abnormal shadow candidate detecting means as judgment supporting criteria, and a control means for displaying the judgment supporting criteria thus set, the abnormal shadow candidate and the marker simultaneously on the display means.

Accordingly, it is possible to support the user in accurately judging the type of an abnormal shadow candidate.

18 Claims, 8 Drawing Sheets

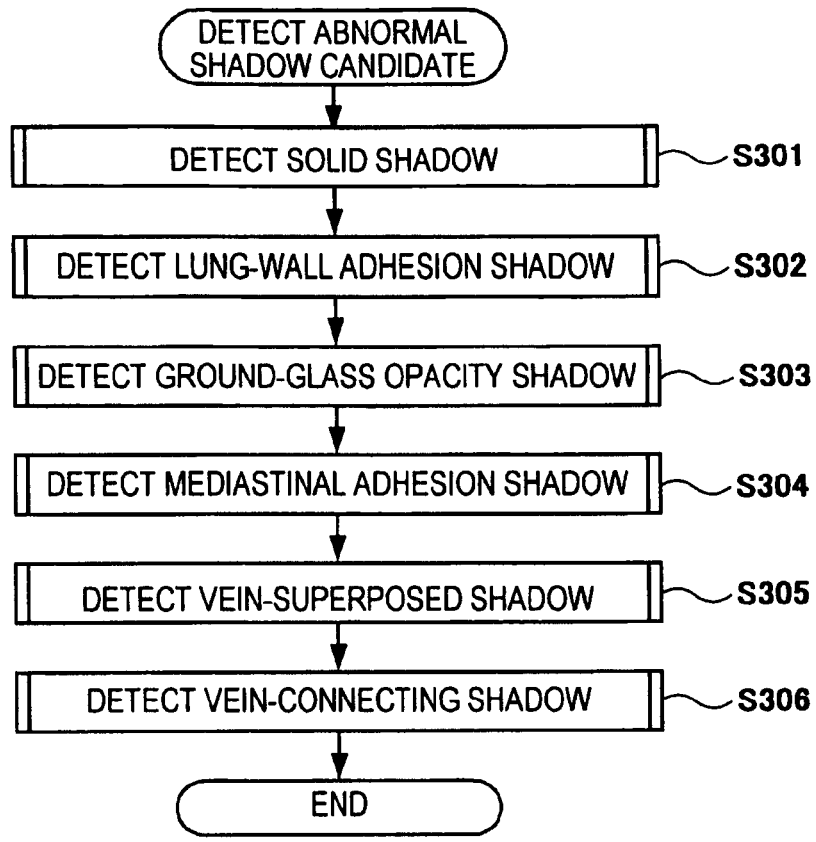
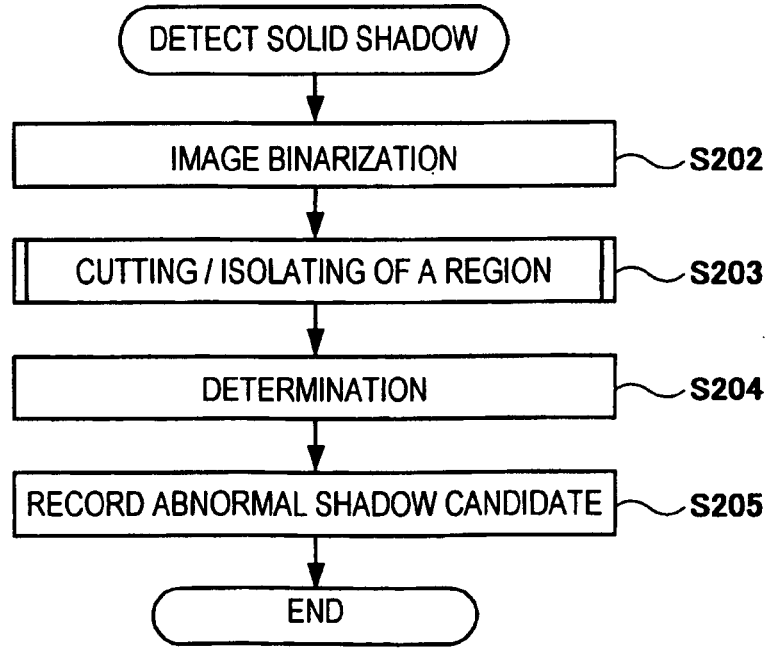

FIG. 5
(a)
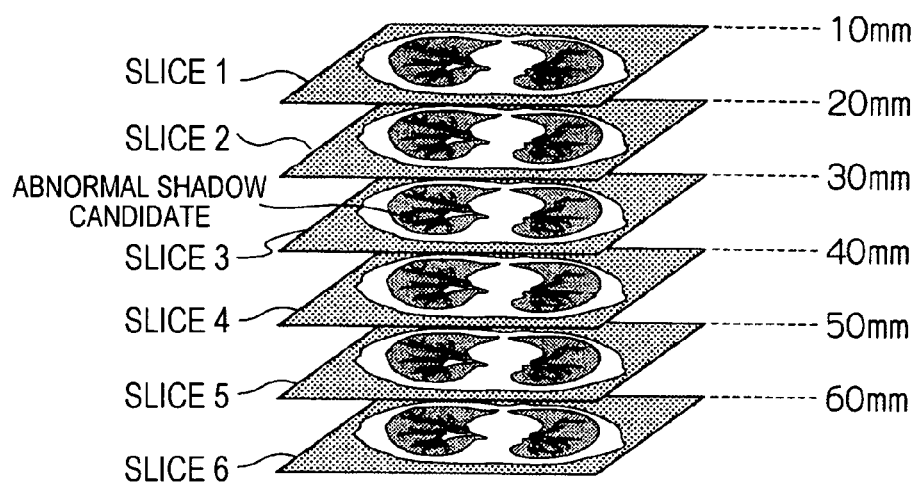
(b)
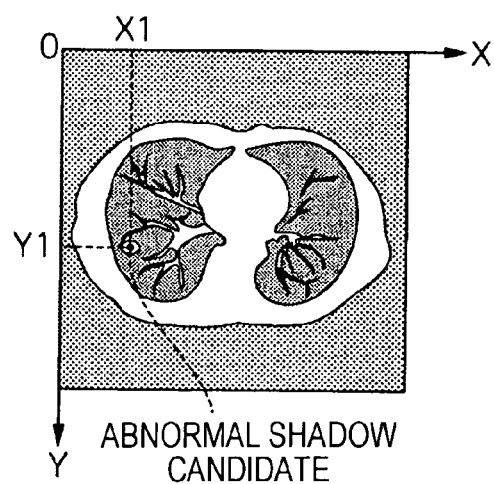
(c)
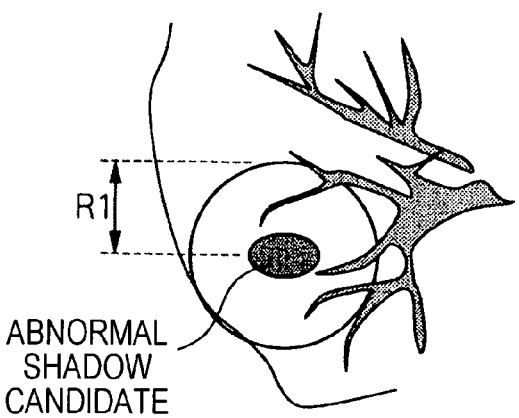

FIG. 6

ABNORMAL SHADOW CANDIDATE DATA TABLE

| NUMBER OF SLICES | COORDINATE OF SHADOW | RADIUS OF MARKER | DETECTION MODULE | ... |
|---|---|---|---|---|
| 3 | X1, Y1 | R1 | SOLID | ... |
| 1 | X2, Y2 | R2 | LUNG-WALL ADHESION | ... |
| 2 | X3, Y3 | R3 | LUNG-WALL ADHESION | ... |
| 1 | X4, Y4 | R4 | GROUND-GLASS OPACITY | ... |
| ⋮ | ⋮ | ⋮ | ⋮ | |

FIG. 8
(a)
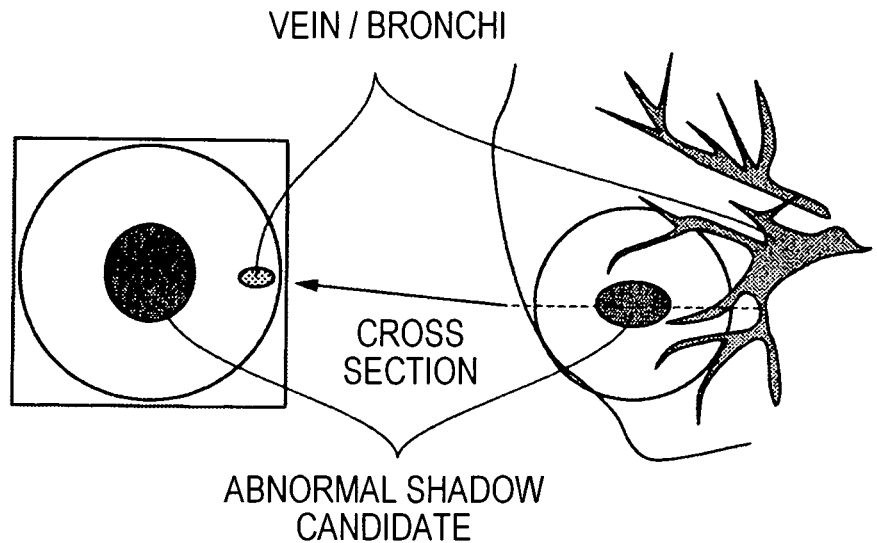
VEIN / BRONCHI
CROSS SECTION
ABNORMAL SHADOW CANDIDATE
(b)
CENTRAL AXIS
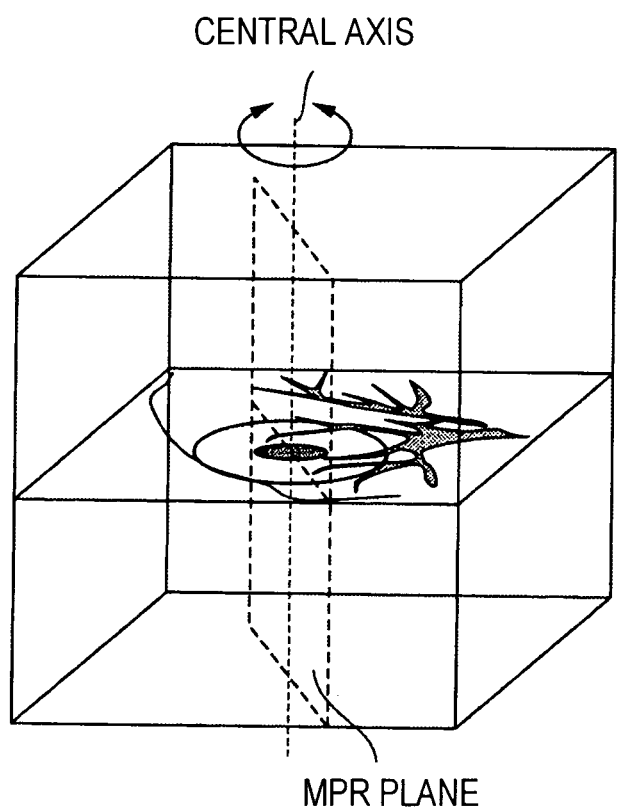
MPR PLANE

US 7,747,053 B2

IMAGE DIAGNOSIS SUPPORTING SYSTEM AND METHOD

TECHNICAL FIELD

The present invention relates to an image diagnosis supporting system and methods thereof for detecting and displaying abnormal shadow/nodule candidates from medical images using a computer.

BACKGROUND ART

Recently the quantity of image data for medical image diagnosis has been drastically improved due to the development of imaging technique of medical image diagnostic apparatuses (modality) such as X-ray CT and MRI.

As for X-ray CT apparatuses, multi-slice CT that arranges a detector in a body axis direction of an object to be examined, or cone beam CT using a detector in which the detection elements are two-dimensionally arranged have become widely used, which enabled imaging tomograms of the wide range portion. In other words, in these multi-slice CT or cone beam CT, quantity of image data has improved drastically due to the addition of a dimension that is a body axis of the object to a two-dimensional tomogram of the object by conventional single-slice CT that makes it three-dimensional.

Also as for MRI apparatus, techniques for high-speed imaging such as a parallel imaging method have become widely used. Since MRI apparatus collects three-dimensional information from the beginning, the quantity of image data will increase by speeding up the collection of three-dimensional image information.

Image readers have been in desperate need of the development of an effective interpretation method for the above-mentioned large amount of image data. Given this factor, one of the methods being developed is CAD (Computer Aided Detection) for detecting abnormal shadow (hereinafter the term "shadow" is treated as synonym of the term "nodule") candidates by making a computer execute a prescribed image recognition process in relation to a plurality of medical images of an object imaged by modality.

Heretofore, as described in "Image Diagnosis Supporting System" of Patent Document 1, CAD superposes a detected abnormal shadow candidate and a marker such as a circle or arrow and displays it on display means in order to indicate the detected abnormal shadow candidate on images of the object.

In the meantime, there are shadows that are not actually abnormal called "false-abnormal shadow" among the abnormal shadow candidates being detected by the above-mentioned CAD, and image readers who carry out the image diagnosis need to differentiate them by their own interpretation and eliminate the discriminated false-abnormal shadows from the abnormal shadow candidates.

Patent Document 1: JP-A-2002-325761

However, the technique of Patent Document 1 includes various deficiencies and disadvantages, such as, for example, the following.

(1) There is no display of the reasons for detection of the abnormal shadow candidates being detected by the above-mentioned CAD.

(2) There is not enough information about the images including the abnormal shadow candidates being detected by the above-mentioned CAD. For example, in a case that the image is one tomogram, no vicinal information of the image thereof is presented.

Stated another way, image readers have to determine the reasons for detection or its vicinal information based on the knowledge from their own experiences, for example, whether the abnormal shadow is false-positive or not, or the condition of the vicinity of the region being imaged based on their anatomical knowledge. As a result, a good amount of time is required of the image readers to determine the above-mentioned issues, and especially for rather inexperienced readers some extra time in seeking the advice of experienced ones for the above-mentioned determinations.

Because of such background, a method to support the above-mentioned determination is strongly desired by image readers.

In an aspect of this disclosure, there is provided an image diagnosis supporting system that comprises:

image data reading means for reading in image data presenting the image of an object to be examined being obtained by a medical imaging apparatus;

abnormal shadow candidate detecting means for detecting abnormal shadow candidates satisfying at least one of a plurality of criteria for abnormal shadow criteria from the read-in images; and display means for superposing and displaying the read-in images and markers indicating the detected abnormal shadow candidates, wherein the image diagnosis supporting system is further provided with:

setting means for setting the criteria to support the determination of the abnormal shadow candidates being detected by the abnormal shadow candidate detecting means as the determination-supporting criteria; and control means for causing the display means to display the set determination-supporting criteria, the abnormal shadow candidate and the marker simultaneously.

Accordingly, an image diagnosis support system to give a support to the effective determination of the type of abnormal shadow candidates can be provided.

In another aspect of this disclosure, there is provided an image diagnosis supporting method that includes:

an image data reading step for reading in the image data representing an image of an object to be examined being obtained by a medical imaging apparatus;

an abnormal shadow candidate detecting step for detecting abnormal shadow candidates satisfying at least one of a plurality of criteria for abnormal shadow from the read-in images;

a step for setting the criteria for supporting the determination of the detected abnormal shadow candidates as the determination-supporting criteria; and a display step for displaying this set determination-supporting criteria, the read-in images and the marker indicating the detected abnormal shadow candidate simultaneously.

Accordingly, an image diagnosis support method that can support an effective determination of the type of abnormal shadow candidates can be provided.

When the techniques of this disclosure are applied, the type of abnormal shadow candidates can be determined more effectively by the determination-supporting criteria.

BEST MODE FOR CARRYING OUT THE INVENTION

Hereinafter, the preferred embodiments of an image diagnosis supporting system relating to the present invention will be described in detail, referring to the attached diagrams.

FIG. 1 is a schematic view of configuration of the image diagnosis supporting system by one embodiment of the present invention.

Image diagnosis supporting system 10 has central processing unit (CPU) 12, main memory 14 being connected via CPU 12 and data bus 30, data recorder 16, display memory 18, display 20 being connected to display memory 18, pointing device 22 being connected via CPU 12 and pointing device controller 24, pointing device controller 24 being connected via CPU 12 and data bus 30, keyboard 26 and network adapter 28.

CPU 12 controls the operation of the respective component parts. Main memory 14 stores the controlling program of image diagnosis supporting system 10. Data recorder 16 is for storing information of an object to be examined such as image data or operation program, and it may be a storage device such as a memory or magnetic disk which is either built in or attached exteriorly to image diagnosis supporting system 10, a device for writing or reading of data in relation to an external media device which can be ejected, or a device for transmitting/receiving data via an external recorder and a network. Display memory 18 temporarily stores image data for display. Display 20 displays images based on image data from display memory 18. Pointing device 22 is a device such as a mouse, trackball, or touch panel, and manipulates a soft switch on the screen of display 20. Pointing device controller 24 detects a position or displacement magnitude of a device such as an encoder or button switch provided to pointing device 22, and the amount of manipulation inputted by an image reader to pointing device 22 based on the detected position or amount of displacement is transmitted to CPU 12 via data bus 30.

Keyboard 26 has a key or switch for setting the various types of parameter, the reader inputs information to the key or switch at his/her discretion, and the inputted information is transmitted to CPU 12 via data bus 30. Network adapter 28 connects image diagnosis supporting system 10 to the Network N such as Local Area Network, telephone lines and the Internet, being connected to external medical imaging apparatus 50 or image data base 60 via Network N, and transmits/receives image data between them.

FIG. 2 is a flow chart showing the process to detect and display the abnormal shadow candidates by image diagnosis supporting system 10 of FIG. 1. CPU 12 controls image diagnosis supporting system 10 according to this flow chart.

First, CPU 12 causes display 20 to display an ID-input screen of an object. The image reader inputs ID number of the object to be examined to the ID-input screen of display 20. At this time, the operator inputs in advance a display mode of display/non-display for the criteria on the detection reasons of abnormal shadow candidates (S201).

Next, CPU 12 reads out image data of the target of the abnormal shadow candidate detecting process from data recorder 16, medical imaging apparatus 50 or image data base 60 based on the inputted ID number of the object (S202). This image data may be any image data obtained from a variety of imaging target regions such as lung, bronchi, breast or intestine of the object by a variety of modality such as X-ray imaging apparatus, X-ray CT device or MRI apparatus. Here as a representative example of image data, CT images obtained from a lung of an object by an X-ray CT device, out of image data of the above-mentioned modality will be described.

Next, CPU 12 executes the abnormal shadow candidate detecting process with regard to the image data being read out by the previously mentioned step (S203).

Then CPU 12 causes display 20, based on the result of S203, to superpose and display the target image and the marker indicating the detected abnormal shadow candidate (S204). Also, CPU 12 controls the display of display 20 based on the display mode for the criteria detection reason of the abnormal shadow candidate being inputted in S201. In other words, CPU 12 displays the criteria for detection reason of the abnormal shadow candidate along with the superposed display of S204 if the display mode shows "display", and the superposed display of S204 remains the way it is if the display mode shows "non-display" (S205).

Hereinafter, a couple of steps in FIG. 2 will be described referring to FIGS. 3 and 4.

FIG. 3 is a flow chart of the abnormal shadow candidate detecting process (S203). The abnormal shadow candidate detecting process includes any of the respective detection process modules for the detection of solid shadow (S301), the detection of lung-wall adhesion shadow (S302), the detection of ground-glass opacity shadow (S303), the detection of mediastinal adhesion shadow (S304), the detection of vein-superposed shadow (S305) and the detection of vein-connecting shadow (S306). The kind, number or order of the detection module is not limited to the ones shown in FIG. 3.

FIG. 4 is a flow chart of the module for executing the detection of solid shadow (S301) in FIG. 3.

First, CPU 12 creates a binary image by executing the threshold process in relation to the read-out image data. In the created binary image, the targeted area is in the separated condition (S401).

Next, CPU 12 executes the isolating process for isolating the separated region in S401 (S402). Then CPU 12 executes the process to determine whether the isolated region satisfies the criteria of solid shadow or not (S403). CPU 12 records information related to the region that is determined as satisfying the criteria of solid shadow (abnormal shadow candidate) to the abnormal shadow candidate data table (see FIG. 6). The abnormal shadow candidate data table is stored, for example, in a part of main memory 14 (S404).

For example, CPU 12 detects an abnormal shadow candidate of a size to be shown by a marker with radius of R1 as shown in FIG. 5 (*c*) in the position of coordinate (X1, Y1) as shown in FIG. 5 (*b*), with regard to slice 3 with slice position of 30 mm as shown in FIG. 5 (*a*) by the solid shadow detection module.

When an abnormal shadow candidate of a size which should be shown with a marker having R1 of radius is detected, CPU 12 records the slice number of which the abnormal shadow candidate is detected, the coordinate of the abnormal shadow candidate, radius of the marker and the criteria on the module of the detected abnormal shadow candidate to the abnormal shadow candidate data table as shown in FIG. 6. The criteria to be recorded in the abnormal shadow candidate data table may include the feature quantity being used upon the detection of the abnormal shadow candidate by the detection module (for example, features such as degree of circularity or ratio between the long axis and short axis) or information with regard to the density or shape of the detected abnormal shadow candidate. The criteria with regard to the detection module may be a comment describing the name of the detection module or the characteristics of the detection module, as long as it represents the reason for the determination of detection on what kind of criteria the abnormal shadow candidate satisfied.

CPU 12 executes the same process as the detection module of solid shadow described in FIGS. 4~6 on the respective detection modules to execute the shadow detection of other than solid shadow (S302~S305), and records the information of the abnormal shadow candidates being detected by the respective detection modules to the abnormal shadow candidate data table. Parameters such as the threshold value in the respective detection module of the binarization (S401) and the process of region breakage and isolating (S402) is set so that the region to be recognized as an abnormal shadow (for example, lung-wall adhesion type in S302) being detected by the respective detection modules is clearly detected. CPU 12 also determines and detects the region that satisfies criteria for the abnormal shadow of the respective detection modules even upon determining of the abnormal shadow candidates (S403).

In this manner, since the criteria about the reason for detection are displayed along with the abnormal shadow candidates in accordance with the present embodiment, the image reader is able to use the criteria to determine whether the abnormal shadow candidate is a false-positive shadow or not can be effectively supported.

Next, image display of the detection result (S204) and display of the criteria about the reasons for detection (S205) will be described referring to FIG. 7. CPU 12 superposes and displays the target image including the abnormal shadow candidates and the markers M1 and M2 indicating the abnormal shadow candidates on display 20 based on the abnormal shadow candidate data table in which the criteria about the abnormal shadow candidate is recorded, as shown in FIG. 7 (a). Markers for indicating the abnormal shadow candidate do not have to be limited to a circle (including an oval) as the examples shown in FIG. 7, but may be other shapes such as a triangle or square, or an arrow for pointing out abnormal shadow candidates. The image reader can select the shape of a marker at his/her request according to the purpose of the diagnosis.

The reader selects marker M1 on display 20 via pointing device 22 or keyboard 26. CPU 12 displays detecting-reason criteria R1 of the abnormal shadow candidate indicated by the selected marker M1 based on the abnormal shadow candidate data table as shown in FIG. 7 (b). In an example of FIG. 7 (b), CPU 12 displays that the marker is applied with a reason coming from a "suspicion of lung-wall adhesion", indicating that the abnormal shadow candidate pointed out by detected marker M1 is the one being detected by the detection module of the lung-wall adhesion shadow.

Also, the procedure of how to display the detecting-reason criteria R1 may be, for example, to display it on a separate region from the image as shown in FIG. 7 (c), or to display it in relation to a plurality of markers as shown in FIG. 7 (d). In other words, any display style can be applied as long as the selected markers and the criteria about the reason for detection of the abnormal shadow candidate to be indicated are corresponding to each other.

Also, detecting-reason criteria R1 and R2 may be displayed with or without the selection of the markers as shown in FIG. 7 (e).

The criteria about the reason of detection may be any kind of criteria as long as it indicates what kind of abnormal shadow criteria the candidate satisfied as a reason for the detection.

Also, CPU 12 may create and display an MPR (Multi Planar Reconstruction) image with regard to the abnormal shadow candidate pointed out by a marker, for example, centering around the gravity point of the abnormal shadow candidate region with radius of the marker as its radius, as shown in FIG. 8 (a). MPR images do not have to be limited to the coronal tomograms as shown in FIG. 8 (a), and the sagittal tomograms may also be used.

Also, CPU 12 may be set so that it creates and displays MPR images being rotated with a predetermined angle, centering on the axis running through the gravity point of the abnormal shadow candidate as shown in FIG. 8 (b).

Though only MPR images are shown in FIGS. 8 (a) and (b) to describe the MPR image in detail, generally the superposed images showing the markers and the abnormal shadow candidates on the same screen are displayed as seen in FIG. 7 (a)~(e).

Also in case of a display device having a plurality of screens, the superposed images in FIG. 7(a)~(e) and MPR images in FIG. 8 may be respectively displayed on a plurality of screens.

Furthermore, CPU 12, with respect to the abnormal shadow candidate pointed out with a marker, may create and display a three-dimensional image, for example, of a range centering on the gravity point of the abnormal shadow candidate with radius of the marker as a radius as shown in FIG. 9.

Three-dimensional images are carried out by well known techniques such as the rendering method that cumulates a plurality of tomograms in the body axis direction, and as for the cone beam CT, a construction method disclosed in documents such as JP-A-2000-217810 called the cone beam three-dimensional construction method.

While only three-dimensional images are shown in FIG. 9 to give detailed descriptions, commonly superposed images showing the markers and the abnormal shadow candidates in one screen are displayed as seen in FIG. 7 (a)~(b).

Also on the screen of a display device having a plurality of screens, the plurality of superposed images shown in FIG. 7 (a)~(e) and the three-dimensional image in FIG. 9 can be displayed respectively.

Accordingly, since the images including the abnormal shadow candidate along with its vicinal information are displayed by MPR images or three-dimensional images, the image reader can use the vicinal information for determining whether the abnormal shadow candidate is a false-positive shadow or not or for grasping the abnormal shadow candidate three-dimensionally, which can be an effective support for diagnosis. Grasping the abnormal shadow candidate three-dimensionally here means grasping, for example, how and what kind of condition the diseased area such as cancer is spread out in the body axis direction of an object.

The above-mentioned embodiment is mere an example for describing the present invention, and they belong to the claim coverage of the present invention either carried out independently or by combination.

INDUSTRIAL AVAILABILITY

The image diagnosis supporting device and the method thereof of the present invention is for detecting and displaying abnormal shadow candidates from medical images by a computer, and for supporting more accurate determination of the type of the abnormal shadow candidates by providing criteria to support the determination.

BRIEF DESCRIPTION OF THE DIAGRAMS

FIG. 3 is a flow chart showing a process to detect an abnormal shadow candidate.

FIG. 4 is a flow chart of a module for detecting a solid shadow.

FIG. 5 is a pattern diagram for describing the criteria relating to an abnormal shadow candidate.

FIG. 6 is a diagram showing an example for an abnormal shadow candidate data table.

FIG. 8 is a pattern diagram for illustrating an MPR image of an abnormal shadow candidate.

Figure 1:
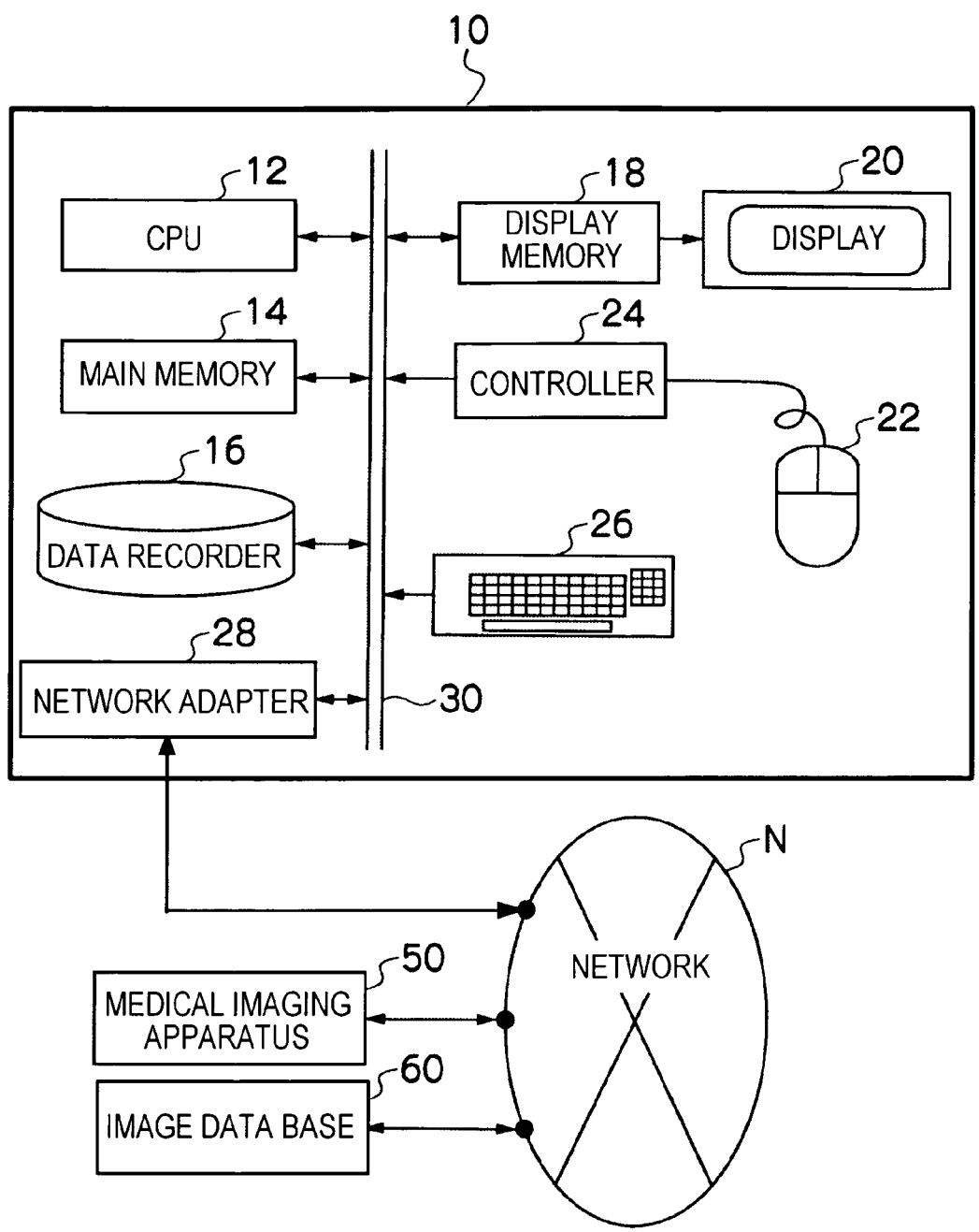
FIG. 1 is a schematic view of the configuration showing an embodiment of an image diagnosis support device relating the present invention.
Figure 2:
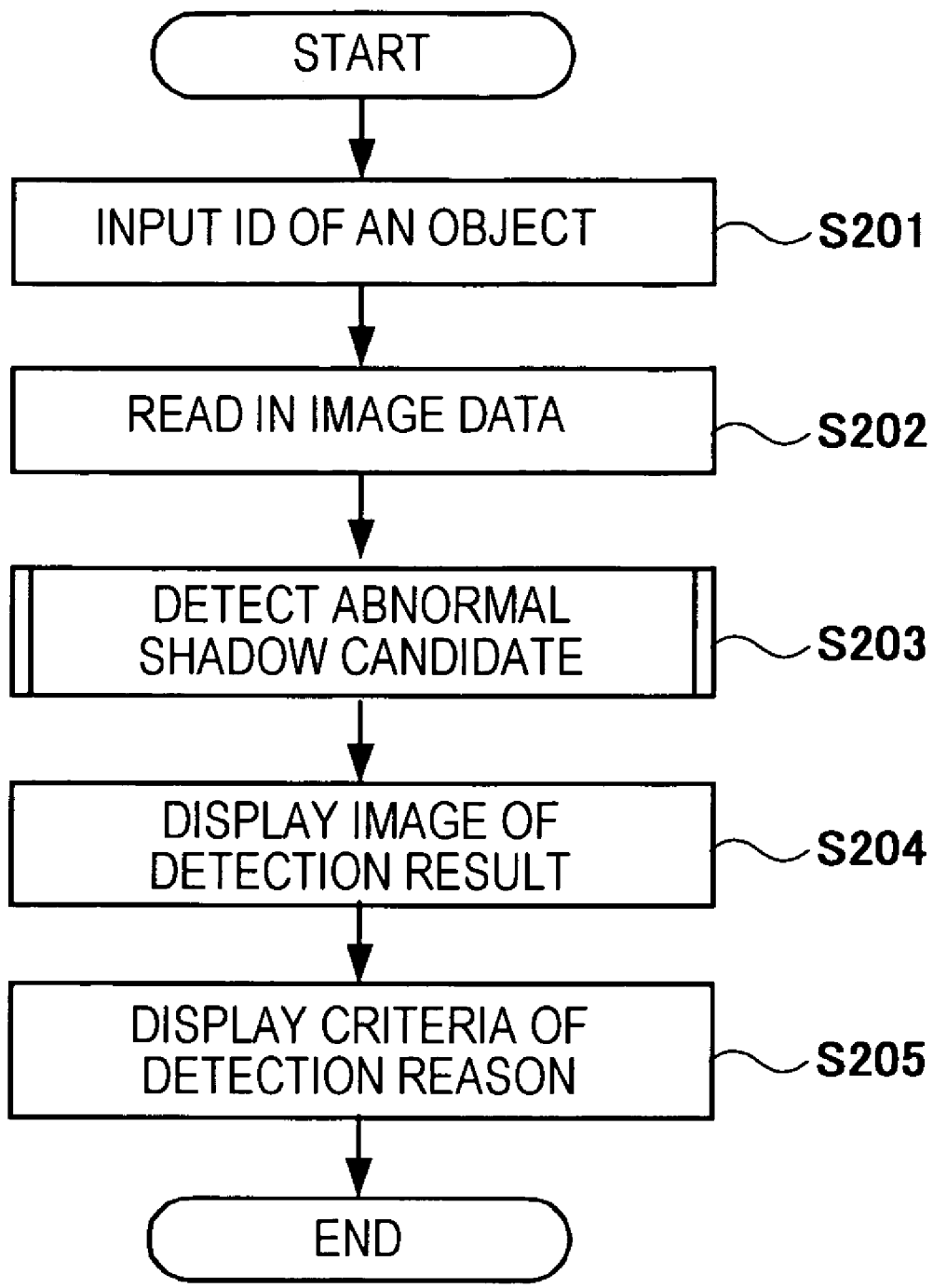
FIG. 2 is a flow chart showing a process to detect and display an abnormal shadow candidate.
Figure 7:
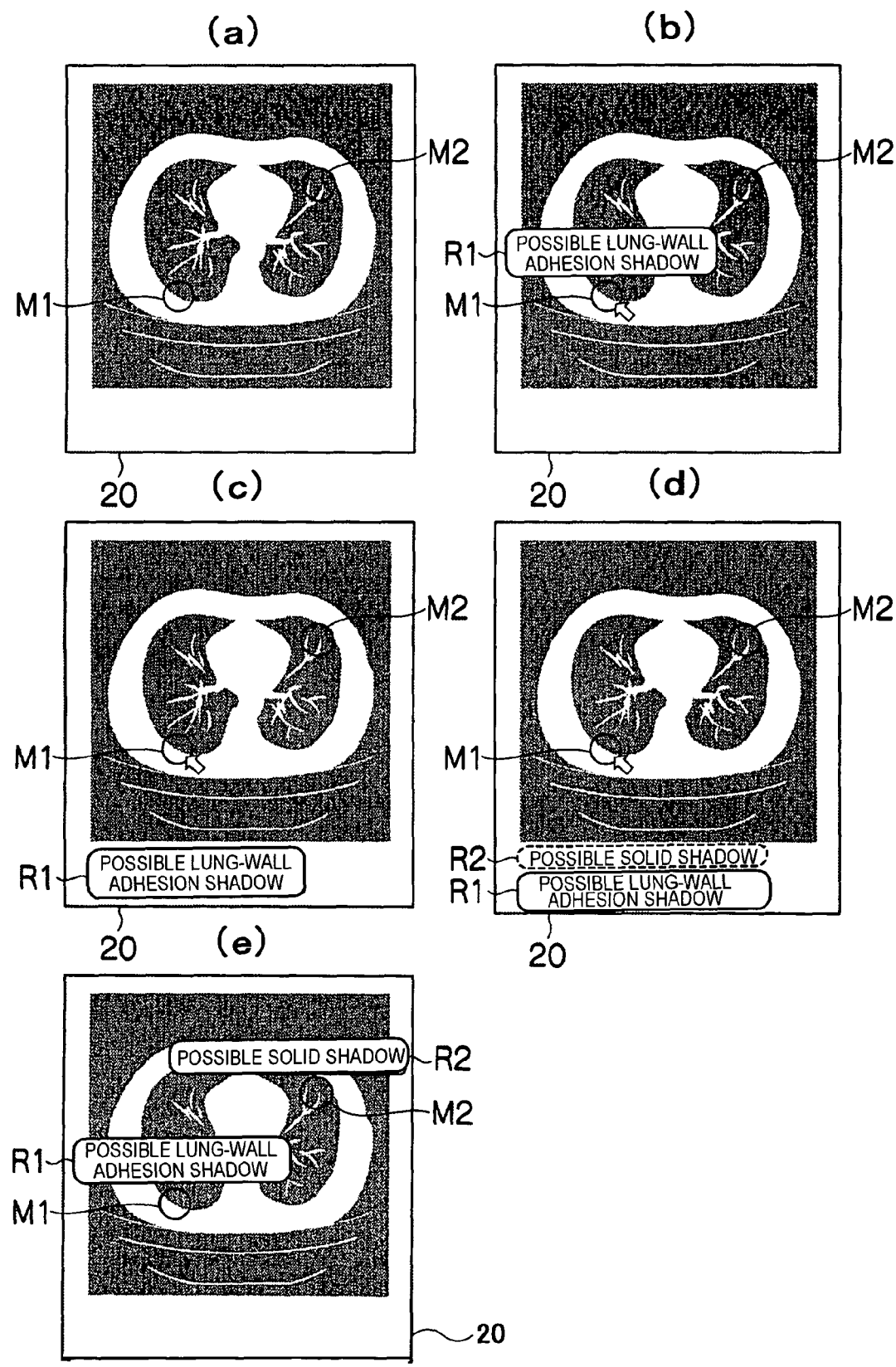
FIG. 7 is a diagram showing a display example of the detection result and the criteria and the reasons for detection.
Figure 9:
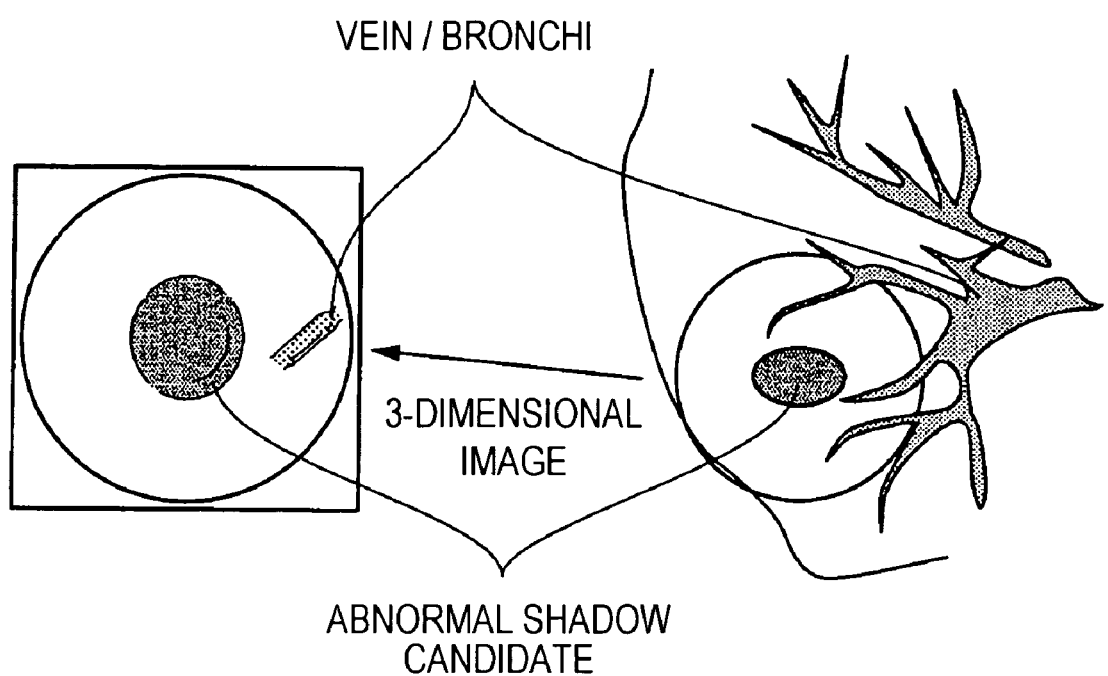
FIG. 9 is a pattern diagram for illustrating a three-dimensional image of an abnormal shadow candidate.

The invention claimed is:

1. An image diagnosis supporting device comprising:
   image data reading means for reading in image data representing an image of an object to be examined being obtained by a medical imaging apparatus;
   abnormal shadow candidate detecting means for detecting an abnormal shadow candidate which satisfies at least one of a plurality of criteria for abnormal shadow candidate from the read-in image; and
   display means for superposing and displaying the read-in image and a marker indicating the detected abnormal shadow candidate,
   wherein the image diagnosis supporting device is further provided with: setting means for setting the criteria to support the determination of the detected abnormal shadow candidate by the abnormal shadow candidate detecting means as the criteria for supporting the determination; and
   control means for causing the display means to display the set determination-supporting criteria, the abnormal shadow candidate and the marker simultaneously.

2. The image diagnosis supporting device according to claim 1, wherein the determination-supporting criteria set by the setting means is the reason for the detection of the abnormal shadow candidates.

3. The image diagnosis supporting device according to claim 2, wherein the setting means further includes a function for setting the display mode which shows display/non-display of detection reason for the abnormal shadow candidate, and the control means selects the detection reason of the abnormal shadow candidate, the abnormal shadow candidate and the marker based on the set display mode and cause the display means to display than simultaneously.

4. The image diagnosis supporting device according to claim 3, wherein the control means causes the display means to display the abnormal shadow candidate detection reason, the abnormal shadow candidate and the marker simultaneously if the set display mode shows "display".

5. The image diagnosis supporting device according to claim 3, wherein the control means causes the display means to display the abnormal shadow candidate and the marker simultaneously if the set display mode shows "non-display".

6. The image diagnosis supporting device according to claim 2, wherein the control means causes the display means to superpose and display detection reason of the abnormal shadow candidate and an image including the abnormal shadow candidate.

7. The image diagnosis supporting device according to claim 2, wherein the control means causes the display means to display detection reason of the abnormal shadow candidate on the region separate from the display region of an image including the abnormal shadow candidate.

8. The image diagnosis supporting device according to claim 2, wherein the control means causes the display means to display detection reason of the abnormal shadow candidate by coordinating an image including the plurality of abnormal shadow candidates and the respective abnormal shadow candidates.

9. The image diagnosis supporting device according to claim 1, wherein control means causes display means to display an image including the abnormal shadow candidate and an MPR image constructed by a plurality of imaging including the previously mentioned image simultaneously.

10. The image diagnosis supporting device according to claim 1, wherein the control means causes the display means to display an image including the abnormal shadow candidate and a three-dimensional image constructed by a plurality of images including the previously mentioned image simultaneously.

11. An image diagnosis supporting method including:
   an image data reading step for reading in image data representing an image of an object to be examined being obtained by a medical imaging apparatus;
   an abnormal shadow candidate detecting step for detecting an abnormal shadow candidate that satisfies at least one of a plurality of criteria for abnormal shadow candidate from the read-in image;
   a step for setting the criteria to support determining the detected abnormal shadow candidate as the determination support criteria; and
   a display step for displaying the set determination support criteria, the read-in image and a marker indicating the detected abnormal shadow candidate simultaneously,
   wherein the determination-supporting criteria set by the setting step is the reason for the detection of the abnormal shadow candidate, and
   wherein the setting step further includes a function for setting the display mode showing "display/non-display" of the reason for detecting the abnormal shadow candidate, and the display step selects and displays detection reasons for the abnormal shadow candidate, the abnormal shadow candidate and the marker based on the set display mode simultaneously.

12. The image diagnosis supporting method according to claim 11, wherein the display step displays detection reasons for the abnormal shadow candidate, the abnormal shadow candidate and the marker simultaneously if the set display mode shows "display".

13. The image diagnosis supporting method according to claim 11, wherein the display step displays the abnormal shadow candidate and the marker simultaneously if the set display mode shows "non-display".

14. The image diagnosis supporting method according to claim 11, wherein the display step superimposes and displays detection reasons of the abnormal shadow candidates and images including the abnormal shadow candidate.

15. The image diagnosis supporting method according to claim 11, wherein the display step displays detection reasons of the abnormal shadow candidates on a region separate from the display region of images including the abnormal shadow candidates.

16. The image diagnosis supporting method according to claim 11, wherein the display step simultaneously displays images including the abnormal shadow candidates and MPR images constructed by a plurality of images including the previously mentioned images.

17. The image diagnosis supporting method according to claim 11, wherein the display step simultaneously displays images including the abnormal shadow candidates and three-dimensional images constructed by a plurality of images including the previously mentioned images.

18. An image diagnosis supporting method including:
   an image data reading step for reading in image data representing an image of an object to be examined being obtained by a medical imaging apparatus;

an abnormal shadow candidate detecting step for detecting an abnormal shadow candidate that satisfies at least one of a plurality of criteria for abnormal shadow candidate from the read-in image;

a step for setting the criteria to support determining the detected abnormal shadow candidate as the determination support criteria; and a display step for displaying the set determination support criteria, the read-in image and a marker indicating the detected abnormal shadow candidate simultaneously, wherein the determination-supporting criteria set by the setting step is the reason for the detection of the abnormal shadow candidate, and wherein the display step displays detection reasons for the abnormal shadow candidates by coordinating images including a plurality or abnormal shadow candidates and the respective abnormal shadow candidates.

* * * * *